UNITED STATES PATENT OFFICE.

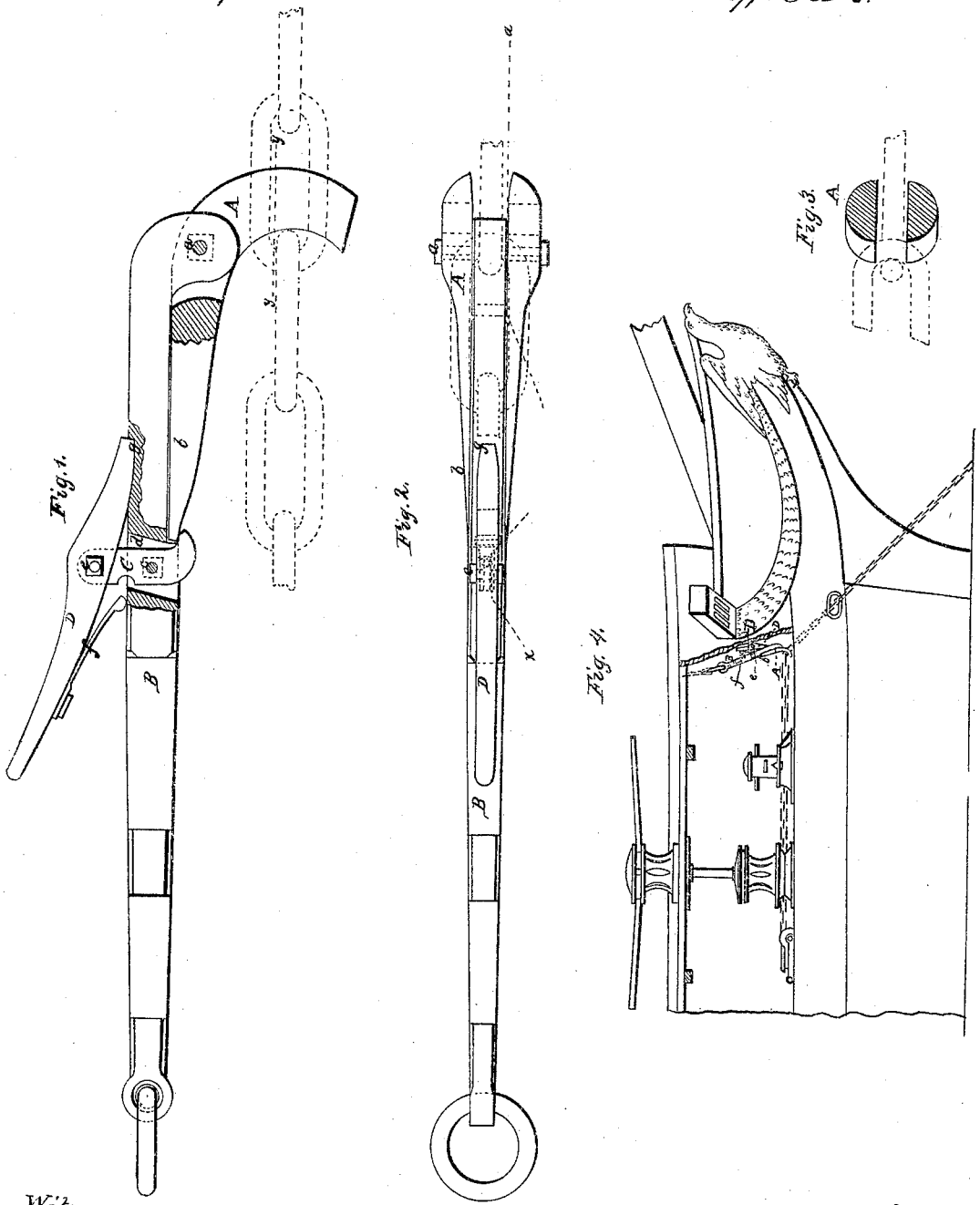

JAMES ROBINSON, OF BARNEGAT, NEW JERSEY.

IMPROVED CABLE-STOPPER.

Specification forming part of Letters Patent No. 37,109, dated December 9, 1862.

*To all whom it may concern:*

Be it known that I, JAMES ROBINSON, of Barnegat, in the county of Ocean and State of New Jersey, have invented a new and Improved Cable-Stopper; and I do hereby declare that the following is a full, clear, and exact description of the same, reference being had to the accompanying drawings, forming a part of this specification, in which—

Figure 1 represents a longitudinal vertical section of my invention, the plane of section being indicated by the line $x$ $x$, Fig. 2. Fig. 2 is a plan or top view of the same. Fig. 3 is a horizontal section of the claw, the line $y$ $y$, Fig. 1, indicating the plane of section. Fig. 4 is a sectional elevation of the bow of a vessel, showing the application of my device to the cable.

Similar letters of reference in the several views indicate corresponding parts.

This invention consists in the arrangement of a hinged forked claw, the shank of which is connected to and operated by a foot-lever in such a manner that the claw when brought to catch over a link of the cable retains the same firmly and prevents it running out, and that by depressing the foot-lever the shank of the claw is released and the cable freed.

To enable others skilled in the art to make and use my invention, I will proceed to describe it with reference to the drawings.

A represents a claw made of steel or other suitable material, and forked so that it catches over one and between the ends of the adjoining links, as clearly shown in Fig. 1, where the links of the cable are indicated in red outline. This claw is secured by a pivot, $a$, to a curved rod or stem, B, which is fastened by a rope to the forecastle or spar-deck, according to position of the hawse-holes, as shown in Fig. 4. The shank $b$ of the forked claw A catches under a dog, C, which is connected to the rod B by a pivot, $c$, and which passes through a slot, $d$, in said rod. This slot is made of such width that the dog C has room to swing backward and forward, and if the dog is in its forward position it retains the shank of the claw, as shown in Fig. 1; but if the upper end of said dog is thrown in the direction of the arrow marked near it in Fig. 1, the shank of the claw is released. The dog C is operated by a foot-lever, which connects with the upper end of said dog by a pivot, $e$, and which is subjected to the action of a spring, $f$, whereby the dog is prevented releasing the claw spontaneously. When it is desired to stop the cable, the claw A is made to catch over one and between the two adjoining links, and the dog C is brought in such a position that it retains the shank of the claw. In order to release the cable, the foot-lever D is slightly depressed and pushed forward, thereby disengaging the shank of the claw from the dog, and the strain of the cable itself throws the forked end of the claw up and the cable is freed. The dog C is prevented releasing the shank of the claw spontaneously by a recess, $g$, in the upper surface of the rod B, which retains the foot-lever, and prevents the same moving forward toward the claw end of the rod until, by depressing the rear end or treadle, the point of said lever is raised so as to clear the recess $g$ and permit of moving the foot-lever forward.

The opertion of my cable-stopper is very simple, it can be easily put up so that it is not in the way, it can easily be removed when not used, and it is cheap and simple in its construction and not liable to get out of repair.

Having thus described my invention, what I claim as new, and desire to secure by Letters Patent, is—

The arrangement of the hinged claw A, in combination with the rod or stem B, dog C, and foot-lever D, all constructed and operating substantially as and for the purpose shown and described.

JAMES ROBINSON.

Witnesses:
   TIMOTHY SHINE,
   M. S. PARTRIDGE.